US012803224B2

(12) United States Patent
Horita

(10) Patent No.: US 12,803,224 B2
(45) Date of Patent: Nov. 17, 2026

(54) CONNECTOR WITH ELECTRICALLY CONDUCTIVE BASE BODY AND REMOVEABLE KEYING MEMBER

(71) Applicant: Tyco Electronics Japan G.K., Kawasaki (JP)

(72) Inventor: Hitoshi Horita, Kawasaki (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 348 days.

(21) Appl. No.: 18/391,916

(22) Filed: Dec. 21, 2023

(65) Prior Publication Data

US 2024/0120687 A1 Apr. 11, 2024

Related U.S. Application Data

(63) Continuation of application No. PCT/JP2022/024797, filed on Jun. 22, 2022.

(30) Foreign Application Priority Data

Jun. 25, 2021 (JP) ................................ 2021-105286

(51) Int. Cl.

*H01R 12/00* (2006.01)
*H01R 13/645* (2006.01)
*H01R 12/70* (2011.01)

(52) U.S. Cl.

CPC ......... *H01R 13/645* (2013.01); *H01R 12/707* (2013.01)

(58) Field of Classification Search

CPC .. H01R 13/645; H01R 12/707; H01R 13/506; H01R 13/465; H01R 13/6596; H01R 13/641; H01R 13/648

See application file for complete search history.

(56) References Cited

U.S. PATENT DOCUMENTS

| | | | |
|---|---|---|---|
| 5,277,627 A | 1/1994 | Matsuzaki | |
| 6,482,045 B2 | 11/2002 | Arai | |
| 8,043,127 B2 | 10/2011 | Bailey et al. | |
| RE43,427 E * | 5/2012 | Dawiedczyk ........ | H01R 13/631 439/357 |
| 9,912,102 B1 | 3/2018 | Lipke et al. | |
| 10,522,950 B2 | 12/2019 | Sakaizawa et al. | |

(Continued)

FOREIGN PATENT DOCUMENTS

| | | |
|---|---|---|
| JP | 615278 U1 | 2/1994 |
| JP | 2010534920 A | 11/2010 |

(Continued)

OTHER PUBLICATIONS

International Search Report and Written Opinion dated Sep. 13, 2022 with English translation, corresponding to Application No. PCT/JP2022/024797, 8 pages.

*Primary Examiner* — Abdullah A Riyami
*Assistant Examiner* — Nelson R. Burgos-Guntin

(57) ABSTRACT

A connector includes an electrically conductive base body and a keying member. The electrically conductive base body defines a mating opening and a connector mating portion adapted to receive a mating connector inserted through the mating opening. The keying member is removably inserted into the connector mating portion. The keying member is adapted to permit a correspondingly shaped mating connector to be inserted into the connector mating portion.

20 Claims, 4 Drawing Sheets

(56) References Cited

U.S. PATENT DOCUMENTS

| | | | | |
|---|---|---|---|---|
| 11,303,070 | B2 | 4/2022 | Maesoba et al. | |
| 2006/0134993 | A1 * | 6/2006 | Dawiedczyk | H01R 13/631 439/676 |
| 2006/0160429 | A1 * | 7/2006 | Dawiedczyk | H01R 12/727 439/676 |
| 2011/0039423 | A1 * | 2/2011 | Blasick | H01R 24/545 439/65 |
| 2021/0051824 | A1 * | 2/2021 | Decrock | H01R 13/6583 |

FOREIGN PATENT DOCUMENTS

| | | | |
|---|---|---|---|
| JP | 2017152307 | A | 8/2017 |
| JP | 2021051925 | A | 4/2021 |
| WO | 0016449 | A1 | 3/2000 |
| WO | 2020017572 | A1 | 1/2020 |

* cited by examiner

CONNECTOR WITH ELECTRICALLY CONDUCTIVE BASE BODY AND REMOVEABLE KEYING MEMBER

CROSS-REFERENCE TO RELATED APPLICATIONS

This application claims the benefit of International Application No. PCT/JP2022/024797 filed on Jun. 22, 2022, which claims priority to Japanese Patent Application No. 2021-105286, filed Jun. 25, 2021, the whole disclosures of which are incorporated herein by reference.

FIELD OF THE INVENTION

The present disclosure relates to a connector composed of an electrically conductive metal material on its outside.

BACKGROUND

Prior art connectors may be shielded by an electrically conductive metal material, such as a die casting, on its outside for an improvement in electromagnetic compatibility (EMC) performance and the like. One of problems with this type of connectors is visibility for making a keying determination. As used herein, a keying determination refers to the determination or identification of a suitable mating connector from among a plurality of types of connectors having similar shapes. The visibility for keying determination refers to a characteristic that enables the mating connector to be visually identified.

According to the prior art, shield structures may be covered with a colored resin member in order to improve the visibility for keying determination. In this embodiment, a connector is mounted on a circuit board and accommodated in a metal enclosure together with the circuit board. The enclosure is provided with an opening enabling the connector accommodated therein to mate with a mating connector. The connector, when being accommodated in the enclosure, is arranged immediately inside the opening of the enclosure. In order to improve the EMC performance, it is desired that the enclosure and the shield of the connector be electrically connected together within as short a distance from each other as possible.

In the connector of the prior art, however, an outer wall of a connector mating portion mating with the mating connector is composed of a resin material. This only permits the connector to be electrically connected to the enclosure behind the connector mating portion, and therefore the distance between the enclosure and the shield of the connector increases, which may cause a decrease in the EMC performance. While the connector of the prior art includes a lug for latching the mating connector and extends to the vicinity of its distal end, this portion is intended to latch the mating connector and cannot be used for electrical connection for the shield.

In view of these circumstances, an object of the present disclosure is to provide a connector that achieves both an improvement in the visibility for keying determination and an improvement in EMC performance.

SUMMARY

According to an embodiment of the present disclosure, a connector includes an electrically conductive base body and a keying member. The electrically conductive base body defines a mating opening and a connector mating portion adapted to receive a mating connector inserted through the mating opening. The keying member is removably inserted into the connector mating portion. The keying member is adapted to permit a correspondingly shaped mating connector to be inserted into the connector mating portion.

BRIEF DESCRIPTION OF THE DRAWINGS

The invention will now be described by way of example with reference to the accompanying Figures, of which:

FIGS. 4(B-1) are 4(B-2) are diagrams showing the keying member and the base body separately.

FIGS. 4(C-1) are 4(C-2) are diagrams showing the keying member and the base body separately.

DETAILED DESCRIPTION OF THE EMBODIMENTS

Figure 1:
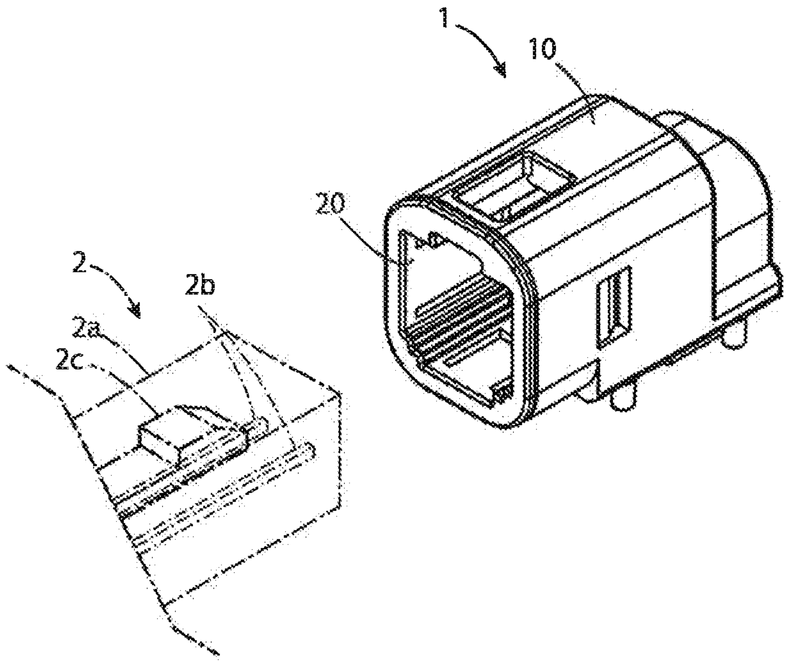
FIG. 1 is an isometric view of a connector as an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. FIG. 1 is an isometric view of a connector as an embodiment of the present invention. A concept of a mating connector is also depicted here by dash-dotted lines.

Figure 2:
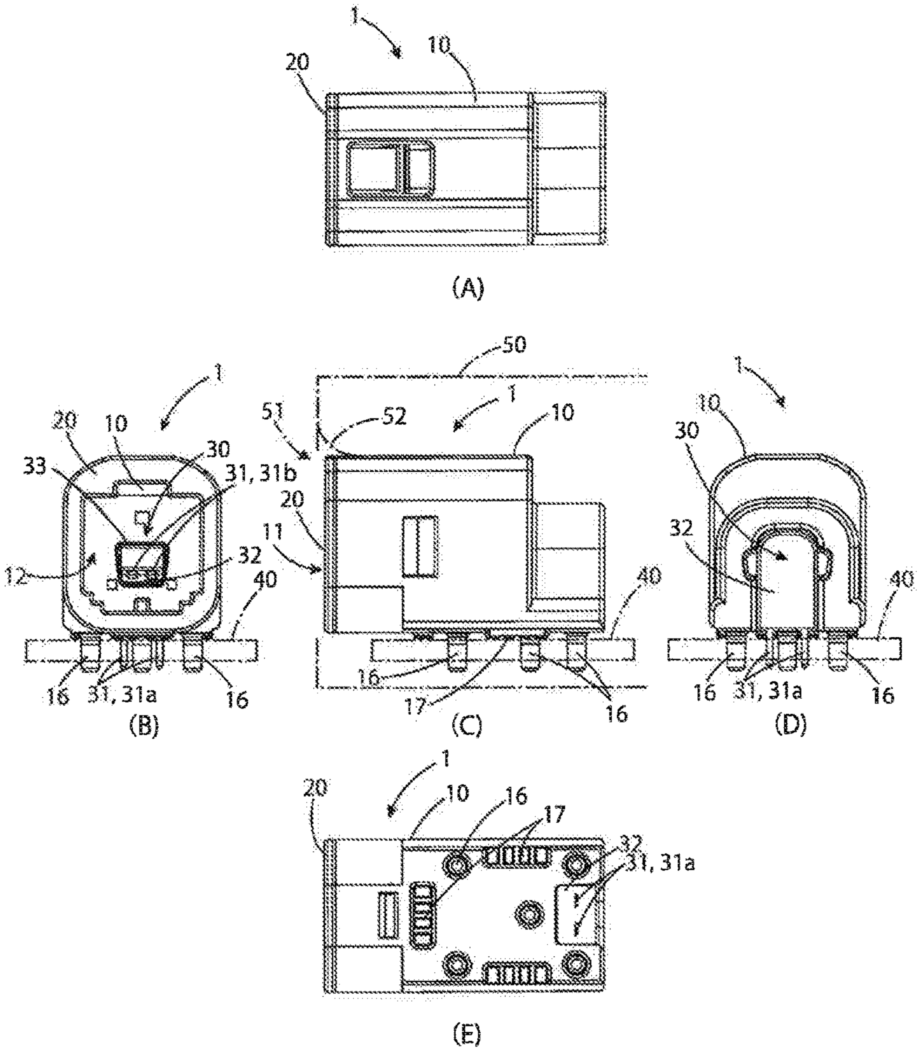
FIGS. 2(A), 2(B), 2(C), 2(D) and 2(E) are five orthogonal views of the connector as an embodiment of the present invention whose isometric view is shown in FIG. 1.
Figure 3:
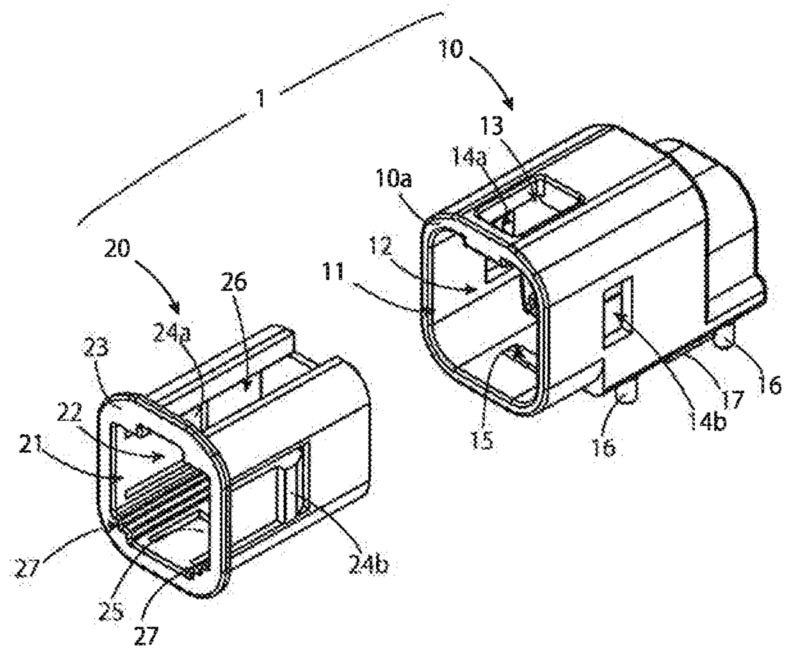
FIG. 3 is an isometric view of the connector as an embodiment of the present invention, showing a keying member and a base body disassembled.

FIG. 1 is an isometric view of a connector 1 according to an embodiment of the present disclosure. FIGS. 2(A)-2(E) are five orthogonal views of the connector, wherein FIG. 2(A) is a top view, FIG. 2(B) is a front view, FIG. 2(C) is a side view, FIG. 2(D) is a rear view, and FIG. 2(E) is a bottom view. In FIGS. 2(B)-2(D), a circuit board 40 is also depicted. Furthermore, in FIG. 2(C), a metal enclosure 50 accommodating the connector 1 together with the circuit board 40 is also depicted. FIG. 3 is an isometric view of the connector 1, showing a keying member 20 and a base body 10 disassembled. Furthermore, FIGS. 4(A-1)-4(C-2) are diagrams showing the keying member 20 and the base body separately 10. More specifically, FIGS. 4(A-1), 4(B-1) and 4(C-1) are a top view, a side view, and a bottom view, respectively, of the keying member. In addition, FIGS. 4(A-2), 4(B-2) and 4(C-2) are a top view, a side view, and a bottom view, respectively, of the base body 10.

With reference to FIG. 1-FIGS. 4(A-1) to 4(C-2), the connector 1 will be described. The connector 1 of the present embodiment includes the base body 10, the keying member 20, and the subunit 30 including a contact. The subunit 30 is assembled in the base body 10 in FIG. 3 and FIGS. 4(A-1) to 4(C-2). A mating connector 2 will be first described with reference to FIG. 1. This mating connector 2 is a connector adapted to mate with the connector 1 of the present embodiment, and includes a housing 2*a*, two contacts 2*b*, and a catch lug 2*c* engaging in the connector 1 to serve as a retainer. The base body 10 and the keying member 20 of the present embodiment will be described primarily with reference to FIG. 3.

The base body 10 is made by die-casting metal and is electrically conductive. The base body 10 is formed with a mating opening 11 opened toward the mating connector 2 (see FIG. 1), inside of which is a connector mating portion 12 adapted to mate with the mating connector 2 plugged in through the mating opening 11. The base body 10A is formed with a catch hole 13 in its top. The catching hole 13 is opened in an outer face (an upper face) of the base body 10 and inside the connector mating portion 12. When the mating connector 2 is plugged or inserted into the connector mating portion 12, the catch lug 2*c* of the mating connector 2 enters the catch hole 13 from inside the connector mating portion 12, thereby retaining the mating connector 2.

In addition, the base body 10 is also formed with catch holes 14*a*, 14*b* on its right and left sides that are opened in outer side faces of the base body 10 and inside the connector mating portion 12. A catch hole 15 is formed in its bottom side that is opened in an outer face of the base body 10 and inside the connector mating portion 12. The catch holes 14*a*, 14*b*, 15 formed at the three locations on the right, left, and bottom are intended to catch and retain the keying member 20 at least partially within the base body 10.

In addition, the base body 10 is formed with a plurality of bosses 16 protruding downward. The bosses 16 are inserted into the circuit board 40, as shown in FIGS. 2(A)-2(E), and are soldered thereto. Furthermore, this base body 10 is formed with a plurality of pads 17 (see also FIG. 4(C-2)) on its bottom face. The pads 17 contact a surface of the circuit board 40 when the bosses 16 are inserted into the circuit board 40, and are soldered to the surface of the circuit board (see FIG. 2(C)). The bosses 16 are equivalent to an example of an insertion-mount portion referred to in the present invention, and the pads 17 are equivalent to an example of a surface-mount portion referred to in the present invention.

The keying member 20 of the connector 1 is made of resin, and has an opening 21 opened toward the mating connector 2, and a large cavity portion 22 on a back side of the opening 21. The mating connector 2 is directly plugged or inserted into the cavity portion 22 of the keying member 20 through the opening 21 with the keying member already inserted in the connector mating portion 12 of the base body 10. The keying member 20 has a flange portion 23 extending around the opening 21. When the keying member 20 is inserted into the base body 10, the flange portion 23 abuts against a front wall 10*a* around the mating opening 11 of the base body 10. As a result, the color of the keying member 20 is easier to visually recognize than that of a keying member having a structure accommodated entirely in the connector mating portion 12.

Figure 4:
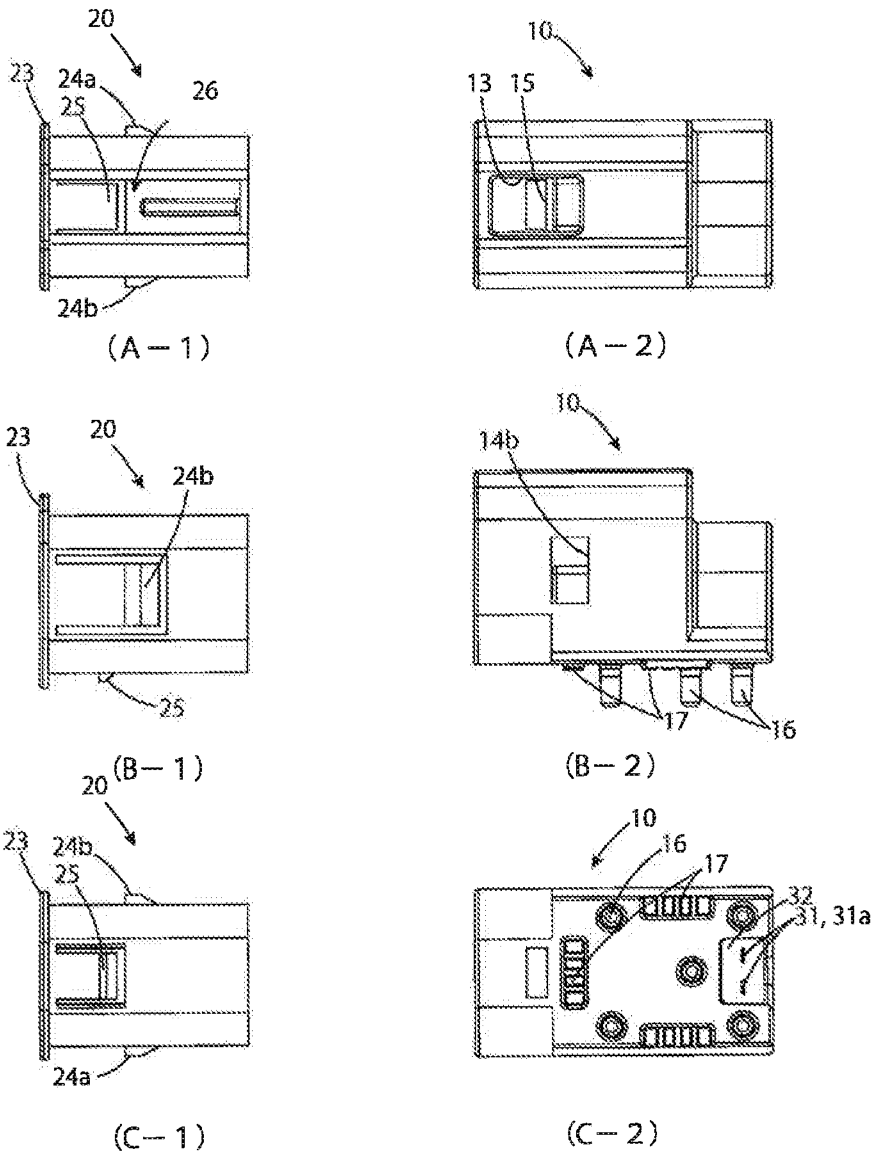
FIGS. 4(A-1) are 4(A-2) are diagrams showing the keying member and the base body separately.

The keying member 20 is provided with catch lugs or elastic latches 24*a*, 24*b* (see FIG. 4(A-1)) on its right and left sides. The keying member 20 is provided with a catch lug or elastic latch 25 (see FIG. 4(B-1)) on its bottom side. When the keying member 20 is inserted into the base body 10, the catch lugs 24*a*, 24*b*, 25 enter the holes 14*a*, 14*b*, 15, respectively, thereby fixing the keying member to the base body. In order to keep the catch hole 13 of the base body 10 opened even with the keying member 20 attached to the base body so that the catch lug 2*c* of the mating connector 2 will not be prevented from catching therein, this keying member is formed with an opening 26 in its top.

Furthermore, the keying member 20 is provided with keying portions 27 on the right and left at the bottom inside the cavity portion 22. The keying portions 27 have a stepped, longitudinally extending shape in an example shown here. The keying portions 27 have a function of allowing only the mating connector 2 that fits this connector 1 to be plugged in, and preventing a mating connector 2 that does not fit this connector 1 from being plugged in. Moreover, the shape of the keying portions 27 and the color of this keying member 20 have one-to-one correspondence, thus improving the visibility for keying determination.

The subunit 30 of the connector 1 of the present embodiment will be described with reference to FIG. 2. The subunit 30 includes two contacts 31. Each contact 31 has a board connecting portion 31*a* (see FIG. 2(D)) and a contacting portion 31*b* (see FIG. 2(B)). The board connecting portion 31*a* is soldered to the circuit board 40. The board connecting portion 31*a* of the contact 31 of the present embodiment is a board connecting portion of a type inserted into the circuit board 40 and soldered thereto. The board connecting portion 31*a*, however, may be a board connecting portion of a type soldered to the surface of the circuit board 40, like the pad 17 on the bottom of the base body 10. In addition, the contacting portion 31*b* extends inside the connector mating portion 12 toward the mating connector, and electrically contacts the contact 2*b* (see FIG. 1) of the mating connector 2 plugged in the connector mating portion.

In addition, the subunit 30 has a sub-housing 32. The sub-housing 32 supports the contacts 31 with the board connecting portions 31*a* of the contacts 31 projecting downward, and also supports the contacting portions 31*b* thereof from below. Furthermore, the subunit 30 has a sub-shield portion 33 enclosing the contacting portions 31*b* of the contact 31 and a portion of the sub-housing 32 supporting the contacting portions from below.

As shown in FIGS. 2(B) and 2(D), the bosses 16 of the base body 10 and the board connecting portions 31*a* of the contacts 31 are inserted into the circuit board 40 and soldered thereto. The pads 17 (see FIG. 4(E)) of the base body 10 are soldered to the surface of the circuit board 40. The connector 1 mounted on the circuit board 40 is accommodated in the metal enclosure 50 (see FIG. 2(C)) together with the circuit board 40. Since the mating connector 2 (see FIG. 1) is plugged into the connector 1, the metal enclosure 50 is provided with an opening 51 for receiving the connector 1. The connector 1 is arranged immediately inside the opening 51 and in an orientation with the mating opening 11 facing toward the opening 51. The metal enclosure 50 and a shield comprising the base body 10 of the connector 1 are electrically connected together, for example by an electrically conductive tab 52 composed of a portion of the metal enclosure. In the connector 1 of the present embodiment, the keying member 20 is inserted within the connector mating portion 12 except for the flange portion 23. Therefore, the outer faces of the base body 10 extend to an immediate vicinity of the opening 51 of the metal enclosure 50. This enables the metal enclosure 50 and the shield of the connector 1 to be connected together with a short distance therebetween by the electrically conductive tab 52, thus achieving an improvement in its EMC performance. It should be noted that, though the metal enclosure 50 and the shield of the connector 1 are described here by way of example as being connected together by the electrically conductive tab 52 comprising of a portion of the metal enclosure 50, the method of connecting the metal enclosure 50 and the shield of the connector 1 together is not limited to a specific connecting method, and they may be connected together by an electrically conductive member different from the metal enclosure.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

an electrically conductive base body defining a mating opening and having a connector mating portion adapted to receive a mating connector inserted through the mating opening; and a keying member removably inserted into the connector mating portion and defining:

an internal cavity space arranged within the mating opening with the keying member inserted into the connector mating portion, the internal cavity space adapted to removably receive a correspondingly shaped mating connector through an open end thereof; and a keying portion extending into an interior of the internal cavity space and adapted to permit the correspondingly shaped mating connector to be removably inserted into the connector mating portion.

2. The connector according to claim 1, wherein the connector is adapted such that, when the mating connector inserted into the connector mating portion, only a front end portion of the keying member on the mating opening side is exposed from the base body.

3. The connector according to claim 1, wherein the base body includes a catch hole opened through an outer face and inside the connector mating portion, the catch hole adapted to retain the mating connector within the connector mating portion.

4. The connector according to claim 1, wherein the keying member has an opening corresponding to the catch hole of the base body and adapted to permit a portion of the mating connector to pass therethrough to engage with the catch hole.

5. The connector according to claim 1, wherein the base body includes an insertion-mount portion adapted to be inserted into a circuit board and soldered thereto.

6. The connector according to claim 5, wherein the base body further includes a surface-mount portion adapted to contact a surface of the circuit board when the insertion-mount portion is inserted into the circuit board, and adapted to be soldered to the surface of the circuit board.

7. The connector according to claim 1, further comprising a contact, including:

a board connecting portion adapted to be soldered to the circuit board; and a contacting portion extending inside the connector mating portion and adapted to contact a contact of the mating connector in the connector mating portion.

8. The connector according to claim 1, wherein the base body is a metal die casting.

9. The connector according to claim 1, wherein the keying member is a monolithic element formed from resin.

10. The connector according to claim 1, wherein the keying member is one of a plurality of types of keying members having different colors for each of a plurality of corresponding types of mating connectors differently keyed.

11. The connector according to claim 1, wherein the keying member includes a plurality of catch lugs engaging with corresponding openings of the base body and retaining the keying member within the connector mating portion.

12. The connector according to claim 1, wherein the keying member defines a flange abutting an outer surface of the base body with the keying member inserted into the connector mating portion.

13. A connector assembly, comprising:

a connector, including:

an electrically conductive base body defining a mating opening and having a connector mating portion adapted to receive a mating connector inserted through the mating opening; and a keying member removably inserted into the connector mating portion and including:

a body arranged within the mating opening and defining a hollow internal cavity and, the internal cavity adapted to receive a correspondingly shaped mating connector through an open end thereof; and a keying portion extending from the body and into an interior of the internal cavity, the keying portion adapted to permit the correspondingly shaped mating connector to be inserted into the connector mating portion; and a mating connector removably inserted into the internal cavity of the body of the keying member and the connector mating portion.

14. The connector assembly according to claim 13, wherein, with the mating connector inserted into the connector mating portion, a front end portion of the keying member on the mating opening side is exposed from the base body.

15. The connector assembly according to claim 13, wherein the base body includes a catch inside the connector mating portion and engaging with the mating connector to retain the mating connector within the connector mating portion.

16. The connector assembly according to claim 15, wherein the keying member has an opening corresponding to the catch hole of the base body and adapted to permit a portion of the mating connector to pass therethrough to engage with the catch hole.

17. The connector assembly according to claim 13, further comprising a circuit board.

18. The connector assembly according to claim 17, wherein the base body includes:

an insertion-mount portion inserted into a circuit board and soldered thereto; and a surface-mount portion contacting a surface of the circuit board when the insertion-mount portion is inserted into the circuit board, and soldered to the surface of the circuit board.

19. The connector assembly according to claim 17, further comprising a contact, including:

a board connecting portion soldered to the circuit board; and a contacting portion extending inside the connector mating portion and contacting a contact of the mating connector in the connector mating portion.

20. The connector assembly according to claim 13, wherein the connector and the circuit board are arranged within an enclosure.

* * * * *